United States Patent [19]
Lorenz

[11] 3,708,696
[45] Jan. 2, 1973

[54] ZERO VOLTAGE SWITCH MEANS FOR CONTROL OF ELECTRIC LOAD CIRCUIT

[75] Inventor: Jerome L. Lorenz, Columbus, Ohio

[73] Assignee: Ranco Incorporated, Columbus, Ohio

[22] Filed: Jan. 28, 1971

[21] Appl. No.: 110,518

[52] U.S. Cl............307/252 B, 219/494, 219/499, 219/501, 307/252 UA, 307/252 W
[51] Int. Cl..............................................H03k 17/56
[58] Field of Search..307/252 B, 252 H, 252 UA, 252 W; 219/494, 499, 501

[56] References Cited

UNITED STATES PATENTS

| 3,564,205 | 2/1971 | Tyler | 219/501 X |
|---|---|---|---|
| 3,469,177 | 9/1969 | Lorenz | 219/501 X |
| 3,440,397 | 4/1969 | Vesper et al. | 219/501 X |
| 3,478,532 | 11/1969 | Cootey et al. | 219/501 X |

Primary Examiner—John Zazworsky
Attorney—Watts, Hoffmann, Fisher & Heinke

[57] ABSTRACT

Four forms of the invention are shown and each comprises a zero voltage switching means for an AC electric load circuit having gate controlled semiconductors which are triggered in response to voltages in a condition sensitive bridge network connected in the AC power source for the load circuit. The network is shunted out of the power source circuit upon changes in power source voltage from zero in power source half cycles applied to the network whereby the components of the network are subjected only to relatively low voltages and during a brief portion of the half cycle. In one form of the invention, a resistance in the bridge network is heated in response to energization of the load circuit and tends to cause cycling of the switching means for accurate control of the load.

6 Claims, 4 Drawing Figures

ZERO VOLTAGE SWITCH MEANS FOR CONTROL OF ELECTRIC LOAD CIRCUIT

BACKGROUND OF THE INVENTION

It has been proposed to control AC power circuits for electric loads by gate controlled semiconductor type switching means which become non-conductive when the power voltage reaches zero in changing from the positive half cycle to the negative half cycle and vice versa, and the switching means may be rendered conductive as the power voltage level swings from zero by a triggering circuit operative to apply a voltage to the gate capable of firing the switching means. Power control means of the type mentioned are referred to as zero voltage switching means. Examples of the zero voltage switching means and control circuits therefor referred to are disclosed in U.S. Pat. Nos. 3,335,291 and 3,486,042. Generally, the triggering circuits were supplied with a DC source which required the use of relatively expensive and unreliable components, such as electrolytic capacitors. Furthermore, where the triggering circuits utilized thermistors, the self-heating characteristics of such devices rendered them inaccurate for temperature controllers. If the sizes of the thermistors were increased to reduce the self-heating effect, the mass of the thermistor would cause sluggish response to temperature changes.

THE PRESENT INVENTION

The present invention is an improvement on zero voltage switching means of the type described in which the triggering circuit derives its power from the AC power source for the load, and comprises means for limiting the voltage and current to the triggering circuit during each AC cycle to which the network is subjected. The components of the bridge network therefore are subject to but a small fraction of the power source voltage and a minimum of current flow. The switching means in the load circuit may or may not be rendered conductive in response to the initial current flow in the bridge network circuit depending upon the condition monitored by the network. The improved circuitry has the advantage of permitting a condition sensing bridge network to receive its power directly from the AC power source and yet be comprised of condition sensing elements, such as thermistors, which are of slight mass so that they respond rapidly to temperature changes and are not heated by current passed therethrough. By limiting current flow in the triggering circuit, self-heating of components is avoided and therefore greater accuracy may be achieved in the control of the switching means. The invention further permits the use of relatively few, low cost components without sacrificing reliability.

Other objects and advantages of the invention will be apparent from the accompanying drawings showing preferred forms of the invention and in which.

Figure 1:
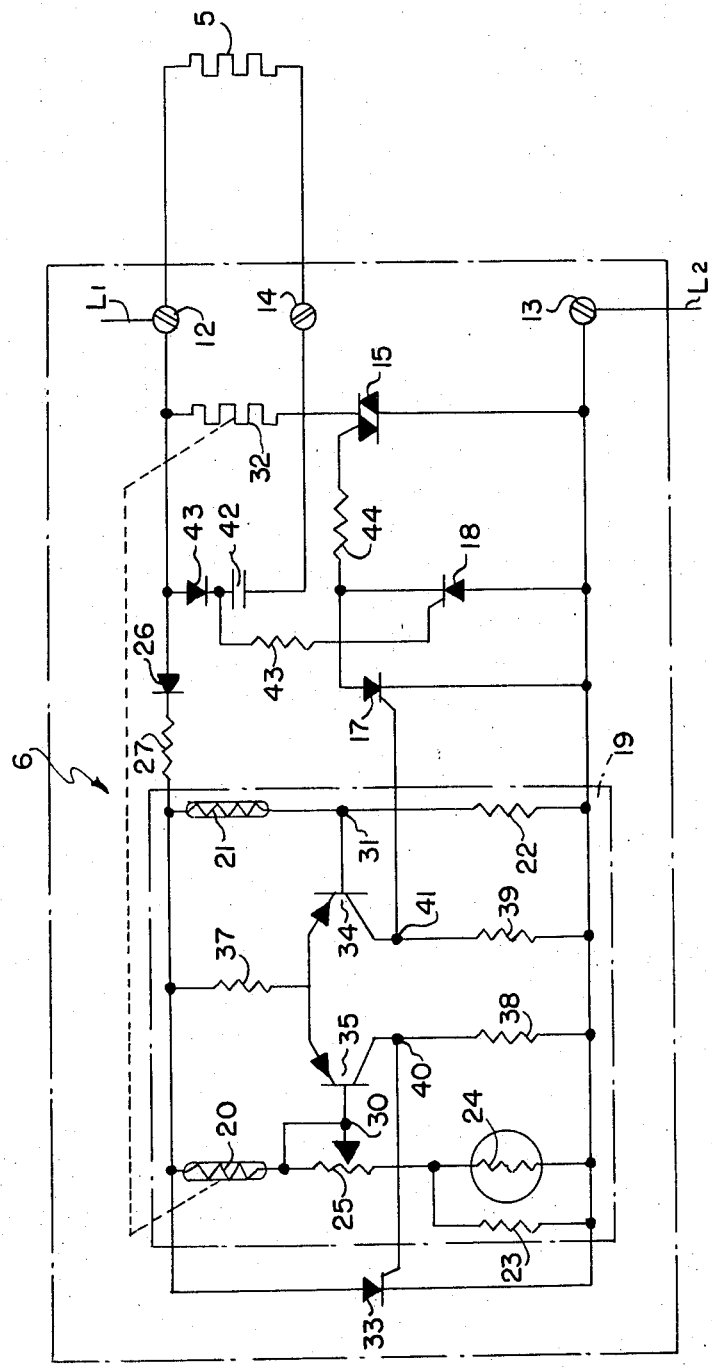
FIG. 1 is a wiring diagram of an electric heating system for a room or the like and a control circuit for the system according to the invention.

Referring to FIG. 1, an electric heating element 5 is shown controlled by a thermally responsive control device 6. The heating element may be arranged to heat a room or to actuate a temperature modifying system for the room, for example. The control device 6 is located to respond to changes in the air temperature in the room.

The control device 6 includes a suitable housing and circuit board, not shown, having terminal posts 12, 13 and 14. AC power is supplied by two power lines L1, L2 connected to the terminals 12 and 13. The lines L1, L2 are connected with a source of suitable current for energizing the heating element 5, such as 115V AC. One side of the heater element 5 is connected with the terminal 14. The flow of energizing current for the heater element 5 is controlled by a semiconductor switch means 15 connected between the terminal posts 13 and 14. The switch 15 is preferably a "Triac" or its equivalent. Semiconductor switches of this type are well known in the art and are not discussed in further detail. When a voltage of about 5 or 6 volts is impressed on the gate of the Triac 15 the Triac will conduct current until the voltage of the power circuit swings to zero.

During the positive half cycles of the power supply, i.e., when terminal 12 is positive relative to terminal 13, the gate voltage of the Triac 15 is controlled by a gate controlled semiconductor or silicon rectifier 17 (SCR). During the negative half cycle of the power supply, i.e., when the terminal 13 is positive relative to the terminal 12, the gate of the Triac 15 is controlled by an SCR 18.

The gate of the SCR 17 is controlled by a temperature sensing triggering bridge network 19 in response to the temperature of the air affected by operation of the heater element 5. As explained more fully hereafter, when the room temperature is at a set level, the SCR 17 will not be triggered or fired and no current flows through the Triac 15 and the heating element 5. When the room temperature falls below the set level, the SCR 17 fires and renders the Triac 15 conductive for a substantial portion of the positive half cycle, thus energizing the heater element. The SCR 18 is also adapted to be triggered or fired during the negative half cycle by a slave circuit which is energized only in the event the Triac 15 was conductive during the preceding positive half cycle.

The temperature sensing bridge network 19 comprises resistors 20, 21, 22 and 23, a negative temperature coefficient thermistor 24 and a potentiometer 25. The bridge network is connected between the terminals 12, 13 through a diode 26 and a voltage dropping resistor 27 so that the network is impressed with a half wave pulsating voltage when the voltage at terminal 12 is positive relative to the terminal 13. The resistance 20, potentiometer 25, resistance 23 and thermistor 24 comprise a temperature sensitive bridge divider having a junction 30. The thermistor 24 is subjected to the temperature of the air affected by operation of the heater element 5. The resistors 20, 21 are preferably of wound wire having a high positive temperature coefficient. The resistor 20 is in close heat exchange relation with a self-heating resistor 32 connected in the power circuit in parallel with the heating element 5. The resistor 21 is subjected to the same ambient temperature as is the resistor 20 so that the local ambient temperature effect on these two resistors cancels the changes in resistances of the temperature sensing bridge and the reference bridge caused by temperature.

The level of voltage at junction 30 for a given temperature of the thermistor 24 and voltage impressed on the sensing network can be set or adjusted by the potentiometer 25. The resistors 21 and 22 comprise a reference bridge divider having a junction 31. When the triggering network is subjected to a positive half cycle, the voltage at the junctions 30 and 31 will increase as the power cycle swings from zero and the temperature of the thermistor 24 and the setting of the potentiometer 25 determines whether or not the rise in voltage at the junction 30 will exceed or lag the rate of voltage rise at the junction 31.

In accordance with the present invention, the temperature sensing bridge circuit 19 is adapted to be shunted out of the power circuit during a substantial portion of each positive cycle of the power supply by a gate controlled semiconductor (SCR) 33 in a bypass circuit connecting resistor 27 and the power circuit terminal 13. The gate of the SCR 33 is controlled in accordance with the voltage at junction 30 and is triggered to fire the SCR each time the voltage rises from zero to a relatively low level across the network and thereby shunt the network out of the power circuit. Consequently the triggering network is subjected to but a fraction of the voltage and current of the power source during operation of the control device 6.

The voltages at the bridge network junctions 30 and 31 are amplified by a differential amplifier and the output of the amplifier is impressed on the gates of SCR 17 and SCR 33. The differential amplifier comprises two transistors 34, 35 having their collectors connected in series with the dropping resistor 27 through a dropping resistor 37. The emitter of the transistor 34 is connected with the power terminal 13 through a resistance 38 and the emitter of the transistor 35 is connected with the power terminal 13 through a resistor 39. The resistors 38 and 39 are effective to develop voltages at the output junctions 40 and 41, respectively, when the transistors 35 and 34 are conductive. As the voltage applied across the bridge network 19 increases from zero one or the other of the transistors 34 and 35 will be more forward biased then the other, depending upon the temperatures of the resistance 20, and the thermistor 24 and the setting of potentiometer 25. Assuming that the potentiometer 25 was set for a given temperature and that the temperature of the thermistor 24 satisfied the setting, the voltage level at 30 would lag that at 31 and transistor 35 would become more conductive than transistor 34. SCR 33 would be triggered prior to SCR 17 and the circuit for network 19 would then be shunted through SCR 33. This shunting action would "dump" the voltage at junction 41 so that SCR 17 would not be triggered and the Triac 15 would remain nonconductive.

Should the temperature of the thermistor 24 fall below that desired, the voltage level at the junction 31 will decrease over that at the junction 30 during each positive half cycle of the power supply thereby causing the transistor 34 to become more conductive than the transistor 35. This raises the voltage at junction 41 to a point to fire the SCR 17, triggering SCR 17 before the SCR 33 is triggered. SCR 17 therefore fires the Triac 15 which becomes conductive and remains conductive for the remainder of the positive half cycle to energize the heater element 5. The voltage across the network 19 continues to rise after SCR 17 is fired and this voltage increase fires SCR 33 which establishes the shunt circuit around the network circuit.

SCR 18 is fired at the beginning of the negative half cycle of the power supply by discharging of a condenser 42 which is charged during the preceding positive half cycle. One side of the condenser 42 is connected with power supply terminal 12 through a diode 43, which is arranged to be forward biased during each positive swing of the supply voltage. The other side of the condenser 42 is connected with the power supply terminal 13 through the Triac 15. During any positive half cycle of the power supply in which the Triac 15 is conducting, the condenser 42 will be charged. During the following negative half cycle, the condenser 42 discharges through a resistor 43 to the gate of SCR 18. The SCR 18 triggers the gate of the Triac 15 through a current limiting resistor 44 and the Triac becomes conductive to energize the heater element 5 during the negative phase of the power cycle.

During energization of the heater element 5, the resistance element 32 heats the bridge resistance 20 thereby tending to reduce the voltage level at the junction 30 relative to the voltage level at junction 31. Thus, the resistor 20 serves to effect cycling of the heating element by the triggering circuit and minimizes temperature differential in the room air.

By shunting the bridge network 19 early in each positive half cycle of the power supply, the voltage impressed on the bridge network never exceeds a relatively low level and the current flow through the network at the low voltage level is for a small portion of the total time of operation of the control circuit. This low current and voltage level permits the use of a minimum number of circuit components and particularly permits the thermistor 24 to be relatively small and light weight so that it responds rapidly to temperature changes. Furthermore, the limited flow of current in the bridge obviates self-heating and a resulting "runaway" condition in the thermistor which would otherwise occur if the bridge circuit were continuously subjected to line voltage. Other advantages of the invention are that the trigger circuits require no power source other than the AC source thereby saving the cost of components while improving the time response and the reliability of the circuits.

Figure 2:
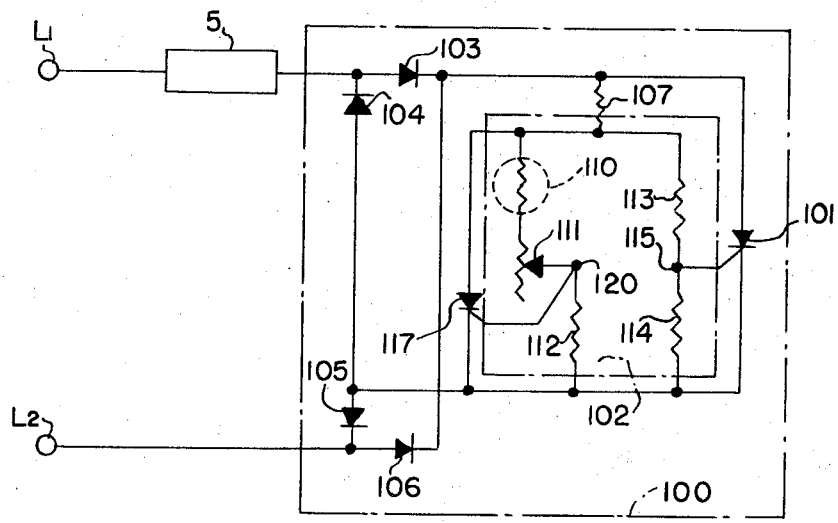
FIGS. 2, 3 and 4 are wiring diagrams showing alternate forms of control circuits embodying the invention.

Referring to FIG. 2, a second form of the invention is shown in which the heating element 5 is supplied with 115V AC current and its circuit is controlled by a temperature sensing device 100 comprising a switching means in the form of an SCR 101 and a triggering circuit 102. The SCR 101 and its triggering circuit 102 are supplied with unfiltered DC current from the lines L1, L2 by a rectifying bridge comprised of four diodes 103, 104, 105 and 106. The triggering circuit for SCR 101 is connected with the rectified current supply bridge through a dropping resistor 107. The triggering circuit includes a negative coefficient thermistor 110, a potentiometer 111 and resistors 112, 113 and 114. The resistors 110, 111 and 112 form a temperature sensitive bridge divider and the resistors 113 and 114 form a reference bridge divider. The gate of SCR 101 is connected to junction 115 between resistors 113 and 114.

The triggering circuit 102 is adapted to be shunted out of circuit by an SCR 117 which is connected between lines L1 and L2 through diode 103, resistor 107 and diode 105. The gate of SCR 117 is connected with junction 120 between potentiometer 111 and resistor 112.

In operation as the voltage of each DC pulse swings from zero, current begins to flow through the triggering circuit 102, developing potential at the gates of both SCR 101 and 117. Should the voltage level for the gate of SCR 101 reach the firing level of the SCR before the voltage at the gate for SCR 117 fires the latter, SCR 101 will be rendered conductive thereby energizing the heater element circuit. On the other hand, if the voltage at the gate of SCR 117 reaches the firing potential prior to the time the SCR 101 is fired, the SCR 117 will be rendered conductive and shunt the triggering circuit which "dumps" the firing potential for SCR 101 thereby preventing energizing of the heater element circuit except through resistor 107, which has a resistance sufficiently high that the element 5 will not become heated.

Whether or not the potential at the gate of SCR 101 reaches its firing level ahead of that at the gate or SCR 117 depends upon the temperature of the thermistor 110 and the setting of the potentiometer 111. In any event, the firing potential of both SCR 101 and SCR 117 are relatively low, as in the order of 1 to 2 volts. Thus, the voltage to which the triggering circuit is subjected is quite limited and the current flow occurs only for a fraction of each current pulse.

Figure 3:
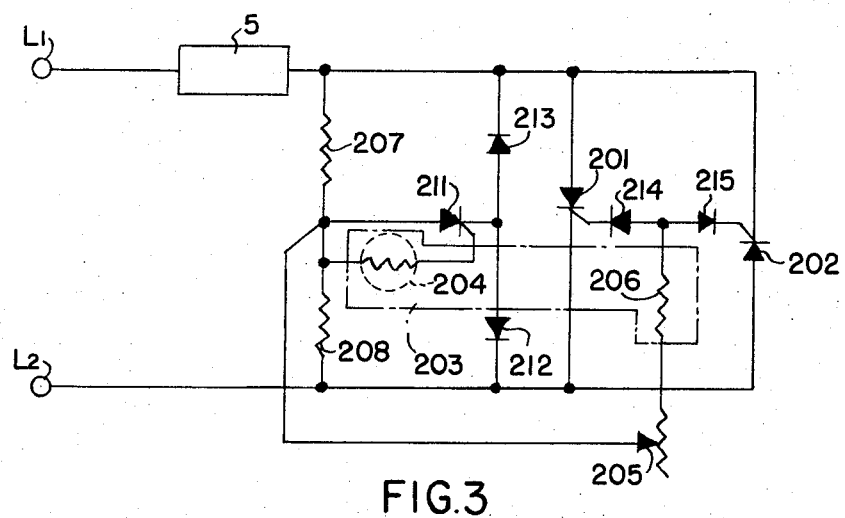

Referring to FIG. 3, still another form of the invention is shown in which the heater element 5 is connected in power lines L1, L2 through two gate controlled semiconductors SCR 201 and SCR 202. SCR 201 and SCR 202 are in parallel circuits and are arranged to conduct the respective half waves of the full wave cycle of the AC current supply. The SCR's 201, 202 are fired by a temperature sensitive triggering circuit 203. The triggering circuit is comprised of a thermistor 204, a potentiometer 205 and a resistor 206. The triggering circuit 203 is connected with line L1 through a dropping resistor 207 and is connected with L2 through a dropping resistor 208. The triggering circuit 203 is adapted to be shunted by a circuit through an SCR 211 and alternatively to line L2 through a diode 212 or to line L1 through a diode 213.

The gates of SCR 201 and SCR 202 are connected with resistor 206 through diodes 214 and 215, respectively. The gate of SCR 211 is connected with thermistor 204.

In operation, when the current voltage of the AC power supply swings from zero to a positive potential and the anode of SCR 201, current flows through resistance 207 and thermistor 204 and applies a voltage on the gate of SCR 211. Also, a voltage potential is developed on the gate of SCR 201 through diode 214. When the temperature of thermistor 204 is at the desired level, the voltage level on the gate of SCR 211 will be above that on the gate of SCR 201 and SCR 211 will be triggered to conduct. The conduction of SCR 211 shunts the circuit 203 through the diode 212. the shunting of circuit 203 "dumps" the voltage at the gate of SCR 201 and that SCR is not fired nor rendered conductive. The resistance 207 prevents any significant current flow through the heater element 5. The potential at which SCR 211 is triggered is relatively low, such as 1 to 2 volts.

In the event the potential on the gate of SCR 211 is lower than that developed at the gate of SCR 201, the latter will be triggered and will conduct the full current load for the heating element 5.

When the current flow reverses, a potential is applied to the anode of SCR 202. Also, a potential is applied to the triggering circuit 203 through resistor 208. A potential is applied to the gate of SCR 202 through the diode 215. Likewise a potential is applied to the gate of SCR 211. If the resistance of thermistor 204 is sufficiently low, SCR 211 will be triggered before SCR 202 is triggered, thereby completing a shunt circuit around circuit 203 through the diode 213. If the resistance of thermistor 204 is relatively high due to relatively low temperature, the voltage level at the gate of SCR 202 will rise to triggering level before SCR 211 is triggered. Thus, SCR 202 will conduct the full load current and energize the heating element.

The triggering voltage required for firing the SCRs 201, 202 and 211 are relatively low so that the components of the triggering circuit 203 are never subjected to load voltage and the duration of the energizing current is relatively short for each half wave of current potential.

Figure 4:
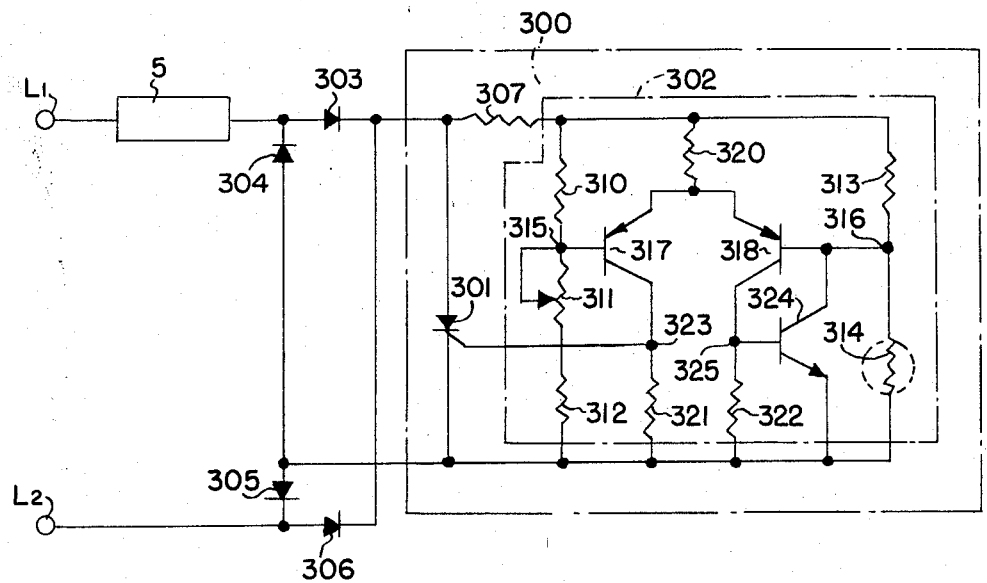

Referring to FIG. 4, another form of the invention similar to FIG. 2 is shown in which the heater element 5 is controlled by a device 300 in series with the load between the AC power supply lines L1, L2. The device 300 includes an SCR 301 and a triggering circuit 302. The AC current supplied by lines L1, L2 is rectified by a full wave rectifier bridge comprised of diodes 303, 304, 305 and 306. The rectifier bridge provides unfiltered DC pulsations to the SCR 301 and to the triggering circuit 302. A dropping resistor 307 is interposed between the rectifying bridge and the triggering circuit. The triggering circuit comprises a reference bridge divider formed by resistance 310, potentiometer 311, resistor 312, and a temperature sensitive bridge divider formed by resistance 313 and thermistor 314. A differential amplifier responds to the voltage differentials at the divider circuit junctions 315 and 316. The differential amplifier comprises two transistors 317 and 318, the bases of which are connected with the junctions 315 and 316, respectively. The collectors of the transistors are connected with resistor 307 through a resistor 320. The emitter of transistors 317 and 318 are connected with diode 305 through resistors 321 and 322, respectively. The gate of SCR 301 is connected with the junction 323 of the output of the transistor 315 and the resistor 321.

A transistor 324 has its base connected with the junction 325 between the output of transistor 316 and resistor 322. The collector of the transistor 324 is connected with the base of the transistor 316 and its emitter is connected with diode 305.

It is apparent that the network 300 is subjected to pulsating half waves of the AC power source and that the degree of conduction through the transistor 317 and 318 depends upon the voltages at junctions 315 and 316, respectively. In the event that the temperature sensed by the thermistor 314 is at that desired according to the setting of the potentiometer 311, the transistor 318 will be more conductive than the transistor 317. Transistor 324 is turned on which then "locks" transistor 318 in its full conductive condition by lowering the voltage at the base of the latter transistor. The turning on of the transistors 318 and 324 effectively shunts the bridge network comprising resistor 310, potentiometer 311, resistor 312, thermistor 314 and resistor 316. The shunt circuit is through the resistor 320 which is many times the resistance of the heating element 5 so that the heating element is not energized. The transistors 318 and 324 become conductive at relatively low voltages across the bridge network so that the flow of current through the network is discontinued in the early portion of each swing of the voltage from zero.

In the event that the temperature sensed by the thermistor 314 is below that for which the potentiometer 311 is set, the transistor 317 will be more conductive than the transistor 318 and will fire SCR 301 prior to the turning on of the shunting transistor 324. SCR 301 therefore establishes the energizing circuit for the heating element 5.

It will be understood that while the foregoing disclosures show the control of a heating element to provide a given temperature, different condition sensitive bridge networks could be employed for producing voltage levels for controlling cooling equipment, equipment whose operation depends upon light or fluid sensing conditions, etc.

I claim:

1. Control means for an electric load including an AC power supply for said load providing voltages alternating in polarity relative to a reference voltage, a first gate controlled switching means in circuit with said power supply and said load and operative to complete an energizing circuit for said load in response to a given triggering voltage applied to a gate thereof, a triggering circuit for the gate of said switching means connected with said AC power supply and including a condition responsive resistance element, a second gate controlled switching means connected with said AC power supply and adapted to form a shunt circuit around said triggering circuit when said second gate controlled switching means is conductive and thereby substantially limit current flow through said triggering circuit, and means to control the gate of said second gate controlled switching means to render said second switching means conductive in response to a given change in voltage value of said AC supply from said reference voltage during each alternation of said AC power supply, said triggering circuit adapted to effect a triggering voltage for said first gate controlled switching means in response to said changes in said AC voltage from said reference voltage and prior to attainment of said given voltage, depending upon the resistance of said condition responsive resistance element.

2. Control means as defined in claim 1 further characterized by said first gate controlled switching means comprising a triac in series with said load, said triggering circuit comprising a differential amplifier and an SCR coupled to one output circuit of said differential amplifier, and said means to control the gate of said second gate controlled switching means comprising another output circuit of said differential amplifier.

3. Control means for an electric load including an AC power supply for said load providing voltages alternating in polarity relative to a reference voltage, a first gate controlled switching means in circuit with said power supply and said load and operative to complete an energizing circuit for said load in response to a given triggering voltage applied to the gate thereof, triggering circuit means to control the gate of said switching means and connected with said AC power supply, means for shunting said triggering circuit means comprising a second gate controlled switching means for effecting current flow through said shunting means when said second gate controlled switching means is conductive and thereby substantially limit current flow through said triggering circuit, said triggering circuit means controlling the gate of said second gate controlled switching means and operable to render said second gate controlled switching means conductive, said triggering circuit means operative in response to a relatively small change in voltage value of said AC supply from said reference voltage to render one or the other of said switching means conductive during each alternation of said AC power supply, and a condition responsive impedance element in said triggering circuit operable to vary the triggering voltage at the gate of one of said gate controlled switching means to selectively cause one of said switching means to conduct prior to conduction of the other of said switching means, depending upon the impedance of said condition responsive impedance element.

4. Control means as defined in claim 3 further characterized by said triggering circuit means comprising first and second voltage divider circuits, said first voltage divider circuit comprising said condition responsive impedance element and having an output which is dependent on the resistance of said element, and said second voltage divider circuit comprising substantially fixed impedances.

5. Control means as defined in claim 3 further characterized by said condition responsive impedance element operatable to vary the triggering voltage at the gate of said second gate controlled switching means.

6. Control means as defined in claim 4 further characterized by the output of said first voltage divider circuit operable to control the firing of said second gate controlled switching means.

* * * * *